United States Patent [11] 3,603,019

| [72] | Inventor | John F. Smeltzer<br>Meriden, Iowa 51037 |
|---|---|---|
| [21] | Appl. No. | 889,484 |
| [22] | Filed | Dec. 31, 1969 |
| [45] | Patented | Sept. 7, 1971 |

[54] COMBINATION FISHING BUCKET
9 Claims, 6 Drawing Figs.
[52] U.S. Cl. .................................................. 43/21.2,
43/54.5, 43/55, 43/56, 220/9 F, 220/85 R
[51] Int. Cl. .......................................................... A01k 97/10
[50] Field of Search............................................ 220/9 R, 9
F, 85 R, 85 D; 43/21.2, 55, 54.5, 56, 57

[56] References Cited
UNITED STATES PATENTS

| 2,264,744 | 12/1941 | Dunnam...................... | 43/21.2 X |
| 2,328,993 | 9/1943 | Norling ........................ | 43/55 |
| 2,555,073 | 5/1951 | Zdankoski.................... | 43/55 X |
| 2,927,712 | 3/1960 | Armato, Sr. et al........... | 220/9 F |
| 3,225,983 | 12/1965 | Majka .......................... | 43/55 X |

Primary Examiner—Joseph R. Leclair
Assistant Examiner—James R. Garrett
Attorney—Zarley, McKee & Thomte ABSTRACT: A combination fishing bucket comprising a bucket portion having a storage compartment formed therein with a cover closing the upper end thereof. The cover is padded with a sponge rubber material to provide a comfortable seat for the fisherman. First, second and third hollow pipe sections are secured to the exterior of the bucket portion approximately 90° apart and are adapted to receive and support either a flashlight or a fishing rod therein. The pipe sections extend upwardly and outwardly from the bucket portion and are designed to permit the fisherman to fish at night with a flashlight being placed in one of the pipe sections so as to direct light on the upper end of the fishing rod in the pipe section adjacent thereto. The first and third pipe sections are spaced approximately 180° apart with respect to the bucket portion to permit the fisherman to selectively use either of the same depending upon the direction of stream flow.

PATENTED SEP 7 1971

3,603,019

INVENTOR
JOHN F. SMELTZER
BY
Zarley, McKee & Thomte
ATTORNEYS

COMBINATION FISHING BUCKET

The principal object of this invention is to provide a combination fishing bucket.

A further object of this invention is to provide a combination fishing bucket including a seat portion provided thereon.

A further object of this invention is to provide a combination fishing bucket having an insulated storage compartment provided therein.

A further object of this invention is to provide a combination fishing bucket having a fishing pole holder secured thereto.

A further object of this invention is to provide a combination fishing bucket having a flashlight holder and a fishing pole holder mounted thereon to permit light to be directed therebetween the upper end of the fishing pole during night fishing.

A further object of this invention is to provide a combination fishing bucket having a pair of spaced-apart flashlight holders mounted thereon with a fishing pole holder positioned intermediate therebetween so that light may be directed at the upper end of the fishing pole whether current flow is to the right or left with respect to the fishing bucket.

A further object of this invention is to provide a combination fishing bucket including a fishing pole holder to allow the fisherman to have free use of his hands in either the baiting process or tackle repair.

A further object of this invention is to provide a combination fishing bucket having at least one flashlight holder provided thereon which extend upwardly and outwardly therefrom so that the light from the flashlight will be projected into the air rather than on the water.

A further object of this invention is to provide a combination fishing bucket having fishing pole holders thereon which permits the fishing pole to be quickly removed therefrom without affecting the fishing line.

A further object of this invention is to provide a combination fishing bucket which is economical to manufacture, durable in use and refined in appearance.

Figure 3:
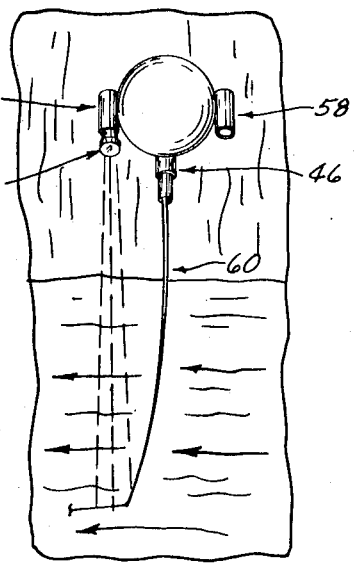
FIG. 3 is a view similar to FIG. 2 except that the flashlight is mounted in the opposite flashlight holder to compensate for current flow which is depicted by arrows.
Figure 4:
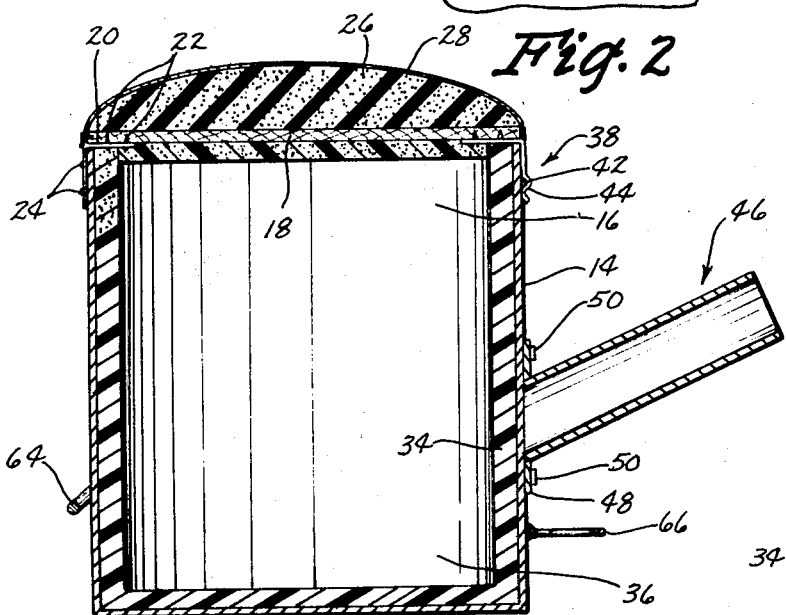
FIG. 4 is an enlarged sectional view as seen along lines 4—4 of FIG. 1.

The combination fishing bucket of this invention is designated by the reference numeral 10 and comprises generally a bottom 12, cylindrical wall 14 and an open upper end 16. Upper end 16 is selectively closed by a flat cover 18 constructed of plywood or the like and having a hinge 20 secured thereto by screws 22 as shown in FIG. 4. Hinge 20 is also secured to wall 14 by suitable means such as rivets 24. As illustrated in FIG. 4, a resilient padding material 26 such as sponge rubber or the like, is positioned on the flat cover 18 and has a waterproof material 28 such as plastic or the like extending thereover. Material 28 is secured to the cover 18 by any convenient means such as band 30 and screws 32 (FIG. 3).

Figure 5:
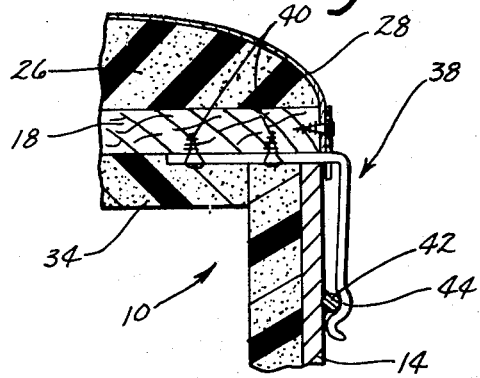
FIG. 5 is an enlarged partial sectional view of the fishing bucket illustrating the spring latch means for maintaining the cover in a closed position.
Figure 6:
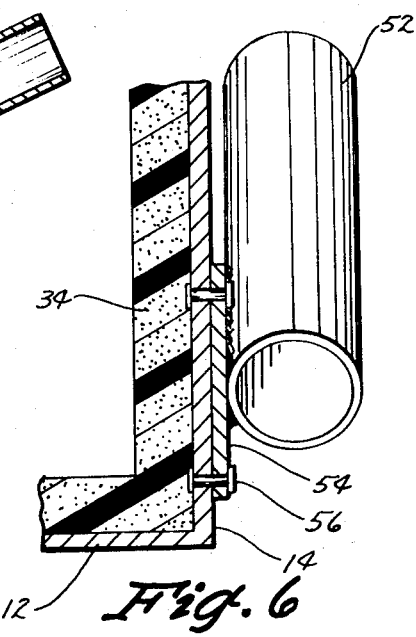
FIG. 6 is an enlarged sectional view as seen along lines 6—6 of FIG. 1.

FIGS. 4-6 illustrate an insulated liner 34 which extends around the interior of the compartment 36 of the bucket to provide a means for storing items therein such as beverages or the like. Preferably, liner 34 is constructed of the styrofoam material which not only provides the necessary insulative qualities for the compartment 36 but also prevents the interior of the bucket from rusting. If liner 34 is not used, the interior of the bucket should be coated with a suitable paint or the like to prevent rusting of the bucket.

The numeral 38 refers generally to a spring latch which is secured to the underside of cover 18 as illustrated in FIG. 5 and which extends downwardly along the exterior surface of the wall 14 as also seen in FIG. 5. Wall 14 has a protrusion 42 secured thereto which is adapted to be received by the arcuate portion 44 of latch 38 to yieldably maintain the cover 18 in a closed position. When it is desired to open the cover 18, the lower end of the spring latch 38 is simply moved outwardly from the wall 14 to disengage the arcuate portion 44 from the protrusion 42. The cover 18 is then pivotally moved about its hinge 20 to provide access to the compartment 36.

The numeral 46 refers to a hollow pipe section or holder having a base plate 48 secured to its lower end by welding or the like as seen in FIG. 4. Base plate 48 is secured by wall 14 by rivets 50 so that holder 46 extends upwardly and outwardly from the wall 14 as seen in FIG. 4. A hollow pipe section or holder 52 having a base plate 54 secured thereto by welding or the like is also secured to wall 14 of bucket 10 by rivets 56 approximately 90° from the holder 46 with respect to the bucket 10. A hollow pipe section or holder 58 is also provided on the bucket 10 at a point approximately opposite to the holder 52 and approximately 90° from the holder 46. Both of the holders 52 and 58 extend upwardly and outwardly with respect to the bucket 10 and are approximately parallel to the holder 46. For purposes of explanation, the numeral 20 refers to a fishing pole while the numeral 62 refers to a flashlight.

Figure 1:
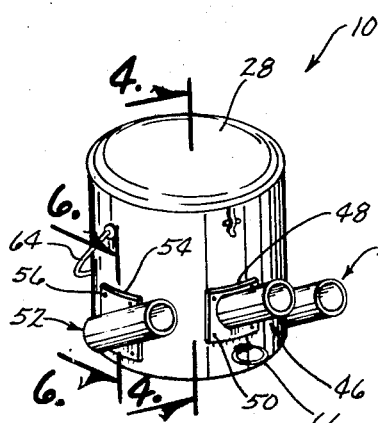
FIG. 1 is a perspective view of the fishing bucket of this invention.
Figure 2:
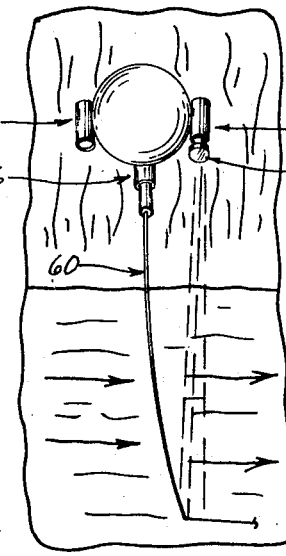
FIG. 2 is a top view of the device illustrating a flashlight in one of the flashlight holders with a fishing pole being mounted in the fishing pole holder, the arrows depicting the direction of current flow.

The normal method of operation is as follows. Assuming that only a single fishing pole is being used, the pole 60 would be inserted downwardly into the holder 46 as illustrated in FIG. 2. With the pole 60 in holder 46, the fisherman has his hands free to make repairs on the tackle and to bait the hook. Assuming that the current is flowing to the right as viewed in FIG. 2, the flashlight 62 would be inserted in the holder 58 so that the beam of light therefrom would be directed at the upper end of the pole 60. The current drag on the fishing line causes the pole 60 to be deflected in the direction of the current as viewed in FIG. 2 and the beam of light from the flashlight 62 would be projected upwardly into the air on the end of the fishing pole 60 and line so that the fisherman can observe the same. FIG. 3 illustrates the current flowing in a direction opposite to that of FIG. 2 and such a situation requires that the flashlight 62 be inserted in the holder 52 rather than the holder 58 so that the beam of light therefrom will be directed at the upper end of the pole and line which is now being deflected in a direction opposite to that illustrated in FIG. 2.

The fisherman may sit on the bucket 10 and will be comfortable thereon due to the padding material 26 being provided. The waterproof cover 28 prevents the padding material 26 from becoming saturated with water.

If the fisherman is fishing for bullheads or the like, he would ordinarily employ two fishing poles and the two fishing poles would be mounted in the holders 52 and 58 with the flashlight being mounted in the holder 46 so that the beam of light therefrom would illuminate the upper ends of both of the poles. The configuration of the holders is such that the fishing pole may be easily removed therefrom without disturbing the line. Such a feature is extremely important since any slight disturbance of the line could cause the fish to drop the bait.

While the drawings illustrate holders 52 and 58 being approximately 180 degrees apart or on opposite sides of the bucket 10 with the longitudinal axis thereof being substantially parallel to that of the holder 46, it should be understood that the holders 52 and 50 could be moved closer towards the holder 46 if desired with the angles of the holders 52 and 58 being varied slightly to compensate for such a change. The relationship of the holders must be such that a flashlight placed in the holders will direct light upwardly into the air onto the upper end of the fishing pole.

The carrying handle or bail 64 provides a convenient means for carrying the bucket 10 which is preferably of the 5 gallon size. It is also desirable that the wall 14 of the bucket 10 be constructed of a sufficiently strong metal material so as to prevent its collapse upon the fisherman sitting thereon. Upon completion of the fishing operation, the fisherman would simply remove the flashlight and fishing poles from their respective holders and carry the device with him as he left the fishing area. Since the holders are rigidly attached to the bucket itself, the fisherman cannot possibly forget the holders as is the case of the fishing holders of the prior art. The bucket 10 provides a sturdy and stable support for supporting the fishing poles and the design thereof prevents the bucket from tipping if a strong pull should be exerted on the fishing line. This is especially true when the storage compartment 36 is filled with beverages or the like.

The stringer attachment 66 secured to the bucket permits the fisherman to conveniently attach their stringers to the bucket.

Thus it can be seen that an extremely useful combination fishing bucket has been provided which frees the fisherman's hands and which provides a convenient means for illuminating the upper ends of the fishing poles to aid the fisherman in his fishing operation. Thus it can be seen that the device accomplishes at least all of its stated objectives.

I claim:

1. In a combination fishing bucket, comprising, a fishing bucket having a top and a bottom said bucket having a storage compartment formed therein, said top being closable by a cover means, a first hollow pipe section secured to said bucket and extending upwardly and outwardly thereupon adapted to receive and support one of a flashlight and fishing rod therein at times, and a second hollow pipe section secured to said bucket spaced from said first pipe section and extending upwardly and outwardly therefrom, the axis of said first and second pipe sections being substantially parallel, said second pipe section being adapted to receive and support one of a flashlight and fishing rod therein.

2. The bucket of claim 1 wherein a stringer attachment ring is secured to the bucket adapted to detachably receive a stringer means.

3. The bucket of claim 1 wherein a third hollow pipe section is secured to said bucket opposite said second pipe section, said third pipe section extending upwardly and outwardly from said bucket approximately parallel to said first and second pipe sections and adapted to support one of a flashlight and fishing rod therein.

4. The bucket of claim 3 wherein said bucket is cylindrical and wherein said second and third pipe sections are secured to said bucket approximately 180 degrees apart and wherein said first pipe section is secured to said bucket approximately 90 degrees from said second and third pipe sections.

5. The bucket of claim 1 wherein said bucket includes a resilient seat portion on said cover.

6. The bucket of claim 5 wherein said bucket storage compartment is lined with an insulative material.

7. The bucket of claim 5 wherein a carrying bail is provided on said bucket.

8. The bucket of claim 5 wherein a spring latch means is secured to said cover adapted to yieldably maintain said cover in a closed position.

9. The bucket of claim 5 wherein said seat portion is covered by a waterproof material.